United States Patent

Rimpo et al.

[11] Patent Number: 6,141,422
[45] Date of Patent: Oct. 31, 2000

[54] SECURE CRYPTOGRAPHIC MULTI-EXPONENTIATION METHOD AND COPROCESSOR SUBSYSTEM

[75] Inventors: Charles Robert Rimpo, Dayton, Md.; John Charles Ciccone; Yongyut Yuenyongsgool, both of Tempe, Ariz.

[73] Assignee: Philips Electronics North America Corporation, Tarrytown, N.Y.

[21] Appl. No.: 08/868,886

[22] Filed: Jun. 4, 1997

[51] Int. Cl.[7] .................................................. H04K 1/00
[52] U.S. Cl. ........................... 380/44; 380/47; 380/282; 708/277; 708/490; 712/16; 364/131; 364/133; 706/10
[58] Field of Search .................................. 708/277, 490, 708/534, 606; 712/16; 364/131, 133; 713/189; 706/10; 380/30, 44, 47, 282

[56] References Cited

U.S. PATENT DOCUMENTS

| | | | |
|---|---|---|---|
| 4,351,982 | 9/1982 | Miller | 178/22.1 |
| 4,399,323 | 8/1983 | Henry | 178/22.14 |
| 4,424,414 | 1/1984 | Hellman | 178/22.11 |
| 4,658,094 | 4/1987 | Clark | 380/28 |
| 4,807,288 | 2/1989 | Ugon | 380/30 |
| 4,870,681 | 9/1989 | Sedlak | 380/30 |
| 4,964,164 | 10/1990 | Fiat | 380/30 |
| 5,369,708 | 11/1994 | Kawamura | 380/30 |

Primary Examiner—Tod R. Swann
Assistant Examiner—Paul E. Callahan
Attorney, Agent, or Firm—Crawford PLLC

[57] ABSTRACT

A system for performing high speed exponentiation in a secure environment. The system includes an interface for receiving encrypted data sent from a host system, a plurality of exponentiators capable of operating concurrently, an encryptor decrypting data received from a host system and encrypting data produced from the exponentiators, and logic circuitry for selecting an available and properly functioning exponentiator to perform exponentiation on the received data.

44 Claims, 4 Drawing Sheets

SECURE CRYPTOGRAPHIC MULTI-EXPONENTIATION METHOD AND COPROCESSOR SUBSYSTEM

BACKGROUND OF THE INVENTION

1. Field of the Invention

The present invention relates to a system and method for performing high speed exponentiation, and in particular, to a system and method for performing high speed exponentiation in a secure environment.

2. Description of the Prior Art

The volume of electronic commercial transactions involving confidential information has significantly increased in recent years. For example, financial institutions, such as banks, are increasingly conducting business via electronic transfers of information. Much, if not all, of this type of information is intended to be kept confidential. Therefore, when the information is transmitted between a source and an end point, it is necessary to install safeguards to protect the confidentiality of the information in the event a third party intercepts or otherwise gains access to the transmission.

Transferred data is typically protected by encrypting it at the source and then decrypting it at the final destination. One way of encrypting and decrypting data is by use of a public key that may be stored at the source and the end designation. There are a variety of cryptographic algorithms currently available to generate a public key, thereby enabling the encrypting and decrypting of data. These algorithms all have in common the need to take one large number and raise it to another large power (i.e., perform an exponentiation function).

The currently available hardware used to implement these cryptographic algorithms cannot support a high volume of electronic commercial transactions. Specifically, existing architecture cannot perform exponentiations at the speed that is required by a customer to be able to do encryption, for example, in a banking server-type of environment.

It can be seen then, that an improved system is needed which can perform a high volume of exponentiations. It can be appreciated that a system that enhances the speed at which exponentiation is performed and which can be done in a secure environment would enable encryption to be performed at the speed and with the protection necessary to support the high volume of confidential commercial transactions that are currently performed in many environments including financial institutions.

SUMMARY OF THE INVENTION

The present invention is directed to a system for performing high speed exponentiation. The system includes an interface for receiving and sending data to a host system, a plurality of exponentiators to perform exponentiation on the data received from the host system, and logic circuitry to select an available and properly functioning exponentiator to perform exponentiation on the received data. In one embodiment, at least two exponentiators concurrently process data.

A more detailed embodiment of the present invention further includes an encryptor coupled between the interface and the exponentiators for encrypting data passing between the exponentiators and the interface. The encryptor may encrypt data using a key encryption key unique to the system of the present invention. Further, the present invention may include a traffic encryption key unique to a particular data transfer.

The present invention is further directed to a method for performing high speed exponentiation of data transferred from a host system. The method includes receiving data, and performing exponentiation of the received data using a plurality of exponentiators. In one embodiment, at least two of the exponentiators concurrently process data. A more detailed embodiment of this invention may include decrypting data received in encrypted form from the host system, and encrypting data produced after performing exponentiation.

The above summary of the present invention is not intended to describe each illustrated embodiment or every implementation, of the present invention. This is the purpose of the figures and of the detailed description that follow.

BRIEF DESCRIPTION OF THE DRAWINGS

Other aspects and advantages of the invention will become apparent upon reading the following detailed description and upon reference to the drawings in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives fitting within the spirit and scope of the invention as defined by the appended claims.

DESCRIPTION OF THE ILLUSTRATED EMBODIMENTS

In exemplary embodiments of the present invention, a subsystem is configured and arranged to receive data from a host system, to perform high speed exponentiation of the data, and to return the resulting data to the host system. The subsystem may be a coprocessor that functions independently on data received from the main processor or host system. High speed exponentiation is performed in the subsystem in a plurality of exponentiators capable of operating in parallel. The exponentiators in the coprocessor subsystem can operate simultaneously on different sets of data received from the host system. The subsystem further includes logic circuitry that monitors the status of each of the exponentiators and transmits data to available and functional exponentiators within the subsystem.

While performing exponentiations on a separate coprocessor enables more exponentiations to be run concurrently, this advantage creates potential problems. For example, the architecture must provide a manner for monitoring the status of the various exponentiators to ensure that data to be exponentiated is not sent to an exponentiator on the coprocessor subsystem that is either malfunctioning or already performing another exponentiation on another set of data. In addition, the architecture must provide a manner to ensure each set of data passing between the host system (main processor) and the coprocessor subsystem is secure. Solutions to these as well as other problems are solved by the exemplary embodiments of the invention detailed below.

In one particular embodiment, the capability to transfer data between the host system and the subsystem in a secure environment is provided. The data on which exponentiation is performed is itself confidential. Therefore, it is important that data passing between the host system and the subsystem is protected in the event it is intercepted. In one particular embodiment of the invention, the transmitted data is protected using encryption involving key encryption keys unique to the specific subsystem to which data is sent and a second set of randomly-generated traffic keys that is unique to each data transfer. The details of this double encryption is explained in more detail below.

Figure 1:
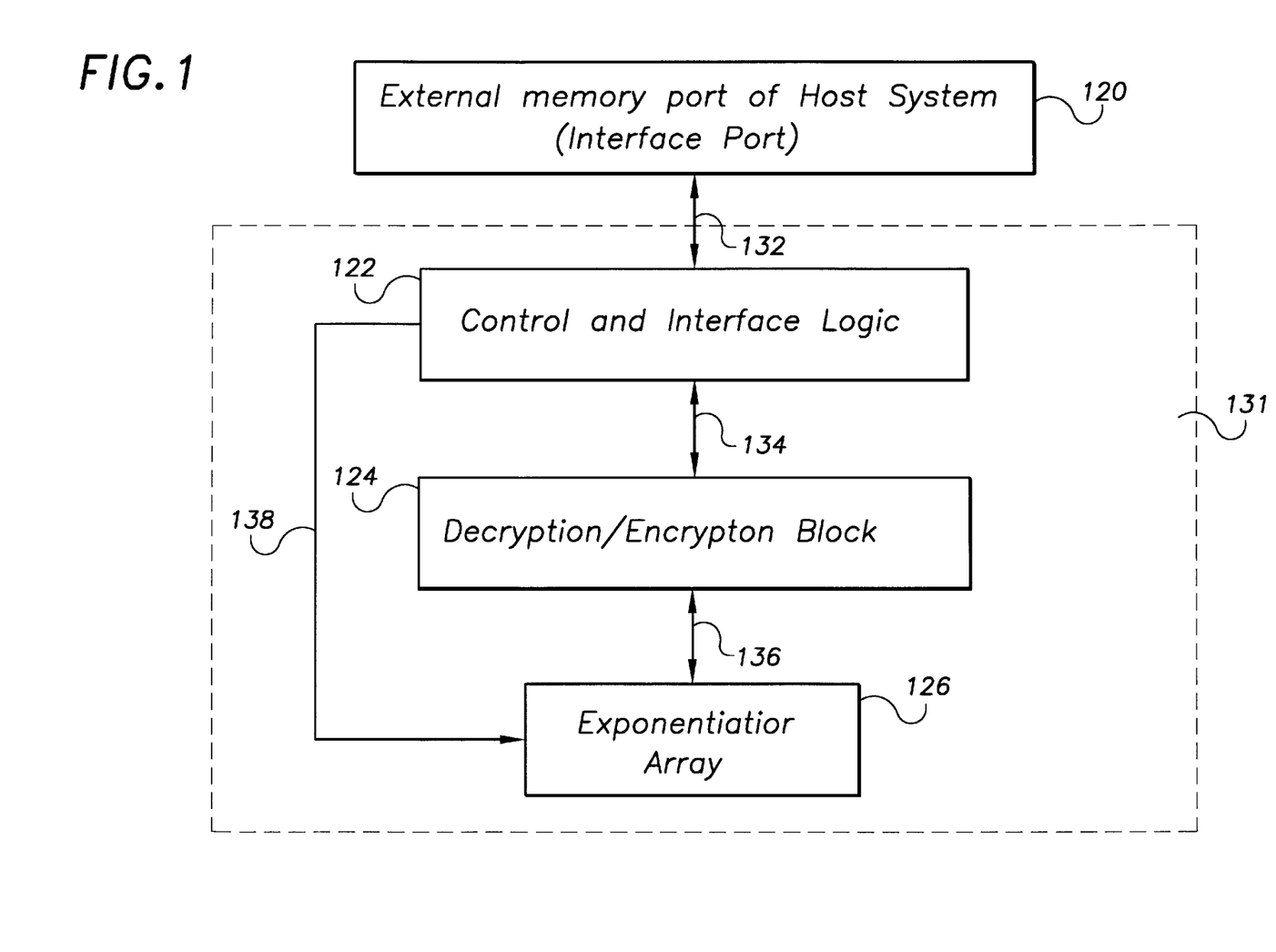
FIG. 1 illustrates an exemplary computer system environment for use in accordance with the present invention.

Referring now to the drawings, and in particular to FIG. 1, there is shown in more specific detail a system for use in performing high speed exponentiation in one embodiment of the invention. The system of FIG. 1 includes a host system having an interface port 120. The host system, which may include a processor, provides data to an exponentiation subsystem 131. Exponentiation subsystem 131, depicted generally by the area within the dashed lines of FIG. 1, includes a control and interface logic 122, an encryption/decryption block 124, and an exponentiator array 126. Interface port 120 of the host system communicates with control and interface logic 122 of subsystem 131. Communication between the host system's interface port 120 and control and interface logic 122 of subsystem 131 occurs, for example, through bus 132. Interface logic 122 is further coupled to encryption/decryption block 124 via link 134. As explained below, encryption/decryption block 124 performs the encryption and decryption of data passing between the host system and subsystem 131. Encryption/decryption block 124 is coupled to exponentiator array 126 via link 136. As seen best in FIG. 3, the exponentiator array 126 consists of a plurality of exponentiators 326a, . . . , 326n. The exponentiators within encryption/decryption 124 of FIG. 1 are connected in parallel, each of which separately communicates with encryption/decryption block 124 via link 136. Similarly, exponentiator array 126 connects to control and interface logic 122 via link 138.

Figure 2:
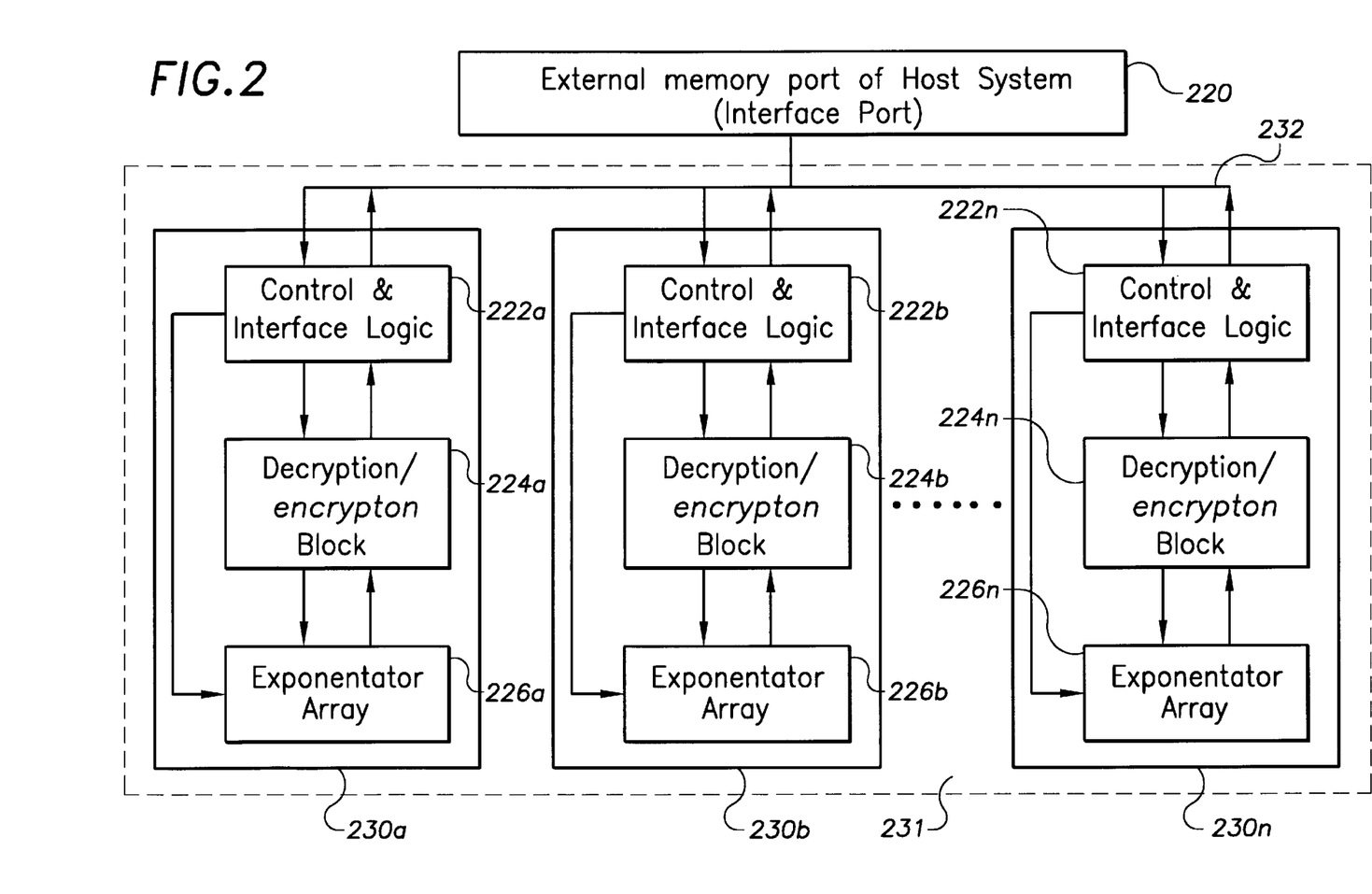
FIG. 2 illustrates the invention of FIG. 1 in which the subsystem is contained on a plurality of chips.

FIG. 2 illustrates one embodiment of the present invention. In FIG. 2, subsystem 231 includes multiple chips 230a, 230b, . . . , 230n. Each of chips 230a, 230b, . . . , 230n separately communicates with interface port 220 of the host system, for example, by bus 232. The chips 230a, 230b, . . . , 230n are individually addressable. For example, each chip may be addressed using a common base address and a unique offset address which distinguishes the particular chip from the other chips in subsystem 231. Exponentiator arrays 226a, 226b, . . . , 226n in each of chips 230a, 230b, . . . , 230n each contain at least one exponentiator. The configuration of the other components in each of chips 230a, 230b, . . . , 230n is the same as described above with respect to FIG. 1. It is appreciated that increasing either or both of the number of chips in subsystem 231 and the number of exponentiators in exponentiator arrays 226a, 226b, . . . , 226n increases the possible number of exponentiators in subsystem 231 that can operate in parallel, and thus increases the amount of computations that can be performed concurrently. A user may add chips to the subsystem based on the number of exponentiations that need to be run concurrently. While scalability is desirable to provide a system customizable for the operating environment and/or number of transactions desired, it also provides greater concerns as information is transferred off chip. These problems are addressed as further described herein. In one multi-chip embodiment, subsystem 231 is provided with sixteen chips connected in parallel with each chip containing from one to eight exponentiators in exponentiator arrays 226a, 226b, . . . , 226n.

While FIG. 2 depicts a multi-chip subsystem 231, it can be appreciated that subsystem 231, in an alternative embodiment, may include only one chip. In this embodiment, the exponentiator array includes at least two exponentiators capable of operating in parallel. The configuration of the other components of this single chip is otherwise similar to the various multi-chip subsystems disclosed in FIGS. 1 and 2 as described previously.

Figure 3:
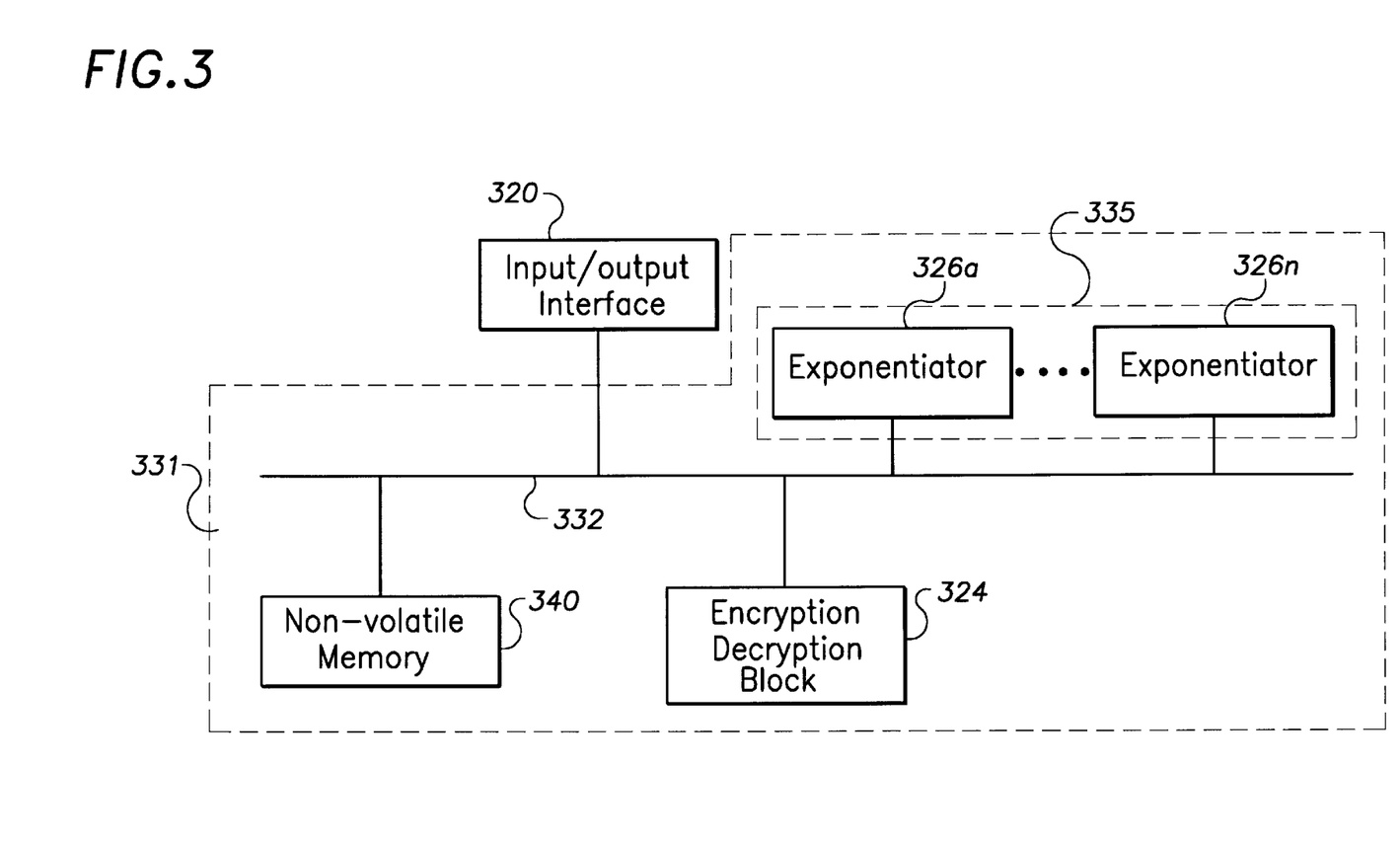
FIG. 3 illustrates specific components of the computer system environment depicted in FIG. 1.

FIG. 3 illustrates a particular embodiment of subsystem 331 in greater detail. Subsystem 331, which is defined as the area inside the dashed lines, includes non-volatile memory 340. As explained below, non-volatile memory 340 stores a first set of encryption/decryption keys unique to subsystem 331. In one particular embodiment, a battery-backed memory which is not externally accessible is used. Though not shown in the embodiment depicted in FIG. 2, each of chips 230a, 230b, . . . , 230n may be provided with a non-volatile memory. FIG. 3 illustrates the plurality of exponentiators 326a, . . . , 326n provided within an exponentiator array 335. Each of exponentiators 326a, . . . , 326n are connected in parallel to interface 320 of the host system. Again, each of exponentiator arrays 226a, 226b, . . . . 226n in chips 230a, 230b, . . . , 230n of FIG. 2 include one or more exponentiators connected in parallel as shown in FIG. 3.

Figure 4:
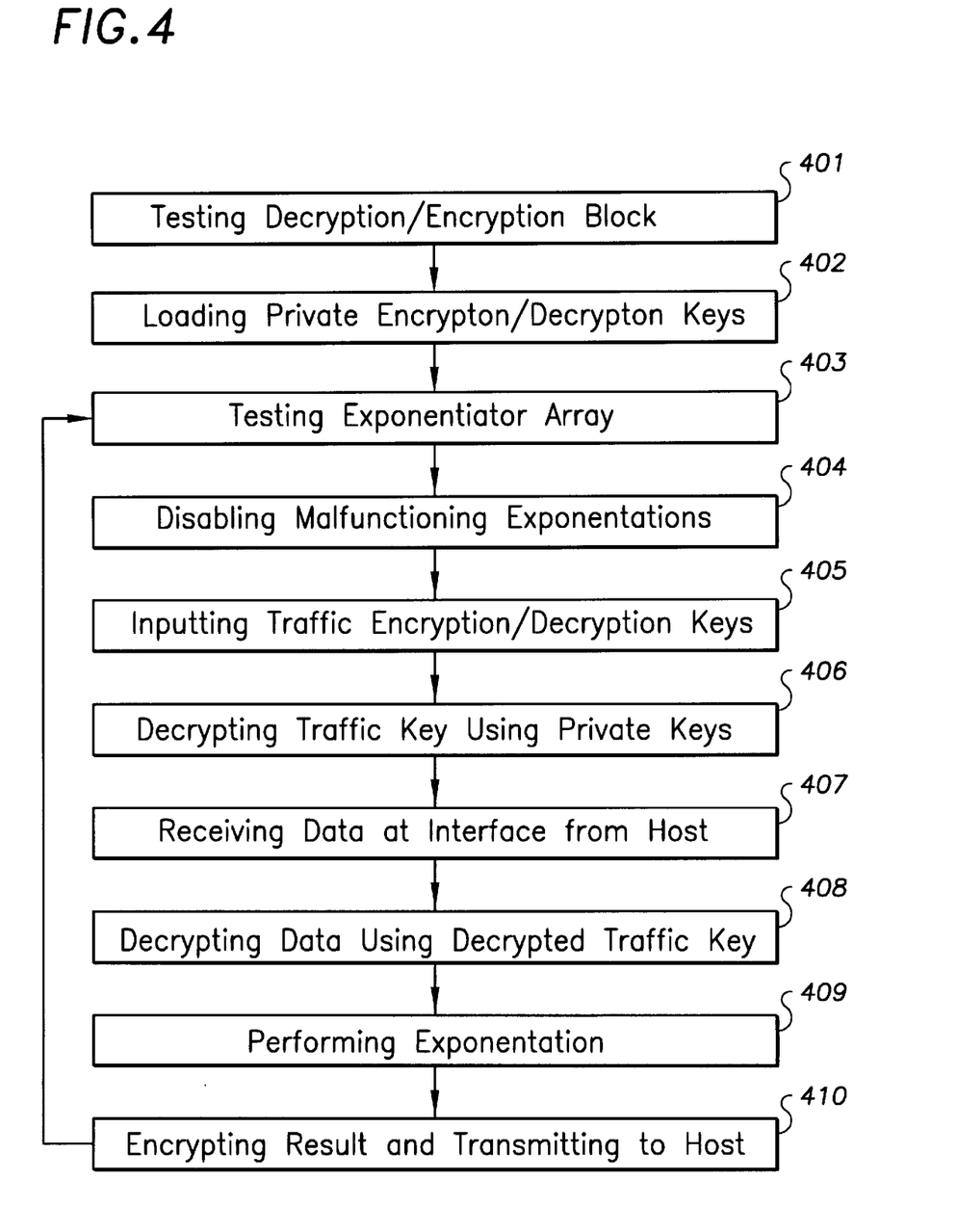
FIG. 4 is a flowchart illustrating exemplary steps, according to the present invention, for performing high speed exponentiation in a secure environment in accordance with the present invention.

FIG. 4 illustrates a method for performing exponentiation according to one embodiment of the present invention. Upon start up, a number of tests are run to ensure proper operation of various components of the subsystem as illustrated in block 401. Specifically, the encryption/decryption block and the non-volatile memory, which stores the first set of encryption/decryption keys for the subsystem, are tested. The host system sends test commands to and receives responses from the non-volatile memory and the encryption/decryption block. The host system, which stores the correct responses that should return in response to the transmitted test commands, compares responses received from the subsystem with the stored responses. Once these tests are successfully completed, the first set of key encryption/decryption keys is loaded into the subsystem at block 402, which as mentioned above, are stored in a non-volatile memory. This first set of key encryption/decryption keys is also stored at the host system and, as explained below, accessed before data passes from the host system to the subsystem.

The host system also runs tests to check the reliability of the various exponentiators in the exponentiator array as illustrated by block 403. The host system sends test data to the exponentiators within the exponentiator array. After performing the exponentiation, each exponentiator sends the results back to the host system which compares the results with the answer that is stored at the host system. If the answers differ, the exponentiator is disabled as illustrated by block 404 and will not be used to perform exponentiations on the subsequent data transmitted to the exponentiation system. The status of each of the exponentiators in the exponentiator array, e.g., whether the exponentiator is functional, may be stored in a status register located on the chip. Each chip in the subsystem may have a status register that monitors the status of the exponentiators in that chip's exponentiator array. The host system also stores the amount of time it should take to receive a result responsive to a given test command. If a result from an exponentiator is not returned in a timely manner, it is assumed that an error has occurred. The host then disables the exponentiator as illustrated by block 404 and the non-functional status of the exponentiator is stored in the status register on the particular chip having that exponentiator.

As noted above, one embodiment of the invention utilizes double encryption to ensure data passing between the host system and subsystem is secure. The host system contains a non-deterministic randomizer. The non-deterministic randomizer generates a traffic encryption/decryption key that is specific to a particular transaction. Before transmitting data to the subsystem, the host accesses the first set of key encryption/decryption keys for the particular subsystem to which data will be sent and encrypts the traffic key with the first set of key encryption/decryption keys, thereby creating an encrypted traffic key. The encrypted traffic key is transmitted from the host system to the subsystem and stored in the encryption/decryption block of the subsystem as illustrated by block 405. As illustrated by block 406 the subsystem decrypts the encrypted traffic key with the first set of key encryption/decryption keys stored in the non-volatile RAM and stores the decrypted traffic key in the encryption/decryption block. Once completed, the host system and the subsystem both have the traffic key for use in encrypting and decrypting data in a specific data transfer. The subsystem uses the decrypted traffic key to encrypt and decrypt data for a particular transmission that passes between the host system and the subsystem.

Once the traffic key is loaded into the subsystem, the host system initiates a transfer of data to the subsystem. The host system encrypts the data with the traffic key unique to the particular transaction and transmits the encrypted data to the subsystem. The subsystem receives the encrypted data at the control and interface logic block as illustrated in block 407. The data passes to the encryption/decryption block, which decrypts the data using the stored traffic key as illustrated in block 408. The decrypted data passes to an exponentiator in the exponentiator array which, according to the updated status register, is not disabled and is not busy. The exponentiator performs exponentiation based on the input data and produces a result at block 409. The resulting data passes back through the encryption/decryption block where it is encrypted using the traffic key as shown in block 410. The resulting data, now in encrypted form, then passes through the subsystem's interface to the host system.

The host system, when launching an exponentiation, identifies the status of the exponentiation in the array in order to select an exponentiator capable of performing the exponentiation. Each chip in a subsystem includes a status register which contains information regarding the availability of each exponentiator in that chip's exponential array. For a subsystem containing a single chip, the host, prior to sending data, polls the status register of the chip to find the status of the exponentiators in that chip, and selects an exponentiator that is both available and not busy performing another exponentiation. If a subsystem contains more than one chip, the host system polls through the status registers of all chips in the subsystem in sequence.

What is claimed is:

1. A system for use in connection with a host system for performing high-speed exponentiation, comprising:

an interface for receiving and sending data to a host system;

a plurality of exponentiators provided to perform exponentiation on data received from the host system; and logic circuitry coupled to receive data to be provided from the host system and adapted to query a status of one of the exponentiators and, in response to an indication of availability, to select said one of the plurality of exponentiators as an available exponentiator, and to use the available exponentiator from said plurality of exponentiators to process the received data.

2. The system according to claim 1, wherein at least two exponentiators process data concurrently.

3. A system according to claim 1, further comprising an encryptor coupled between said plurality of exponentiators and said interface for encrypting data passing between said plurality of exponentiators and said interface.

4. A system according to claim 3, further comprising a non-volatile memory communicating with said encryptor for storing a first encryption key.

5. A system according to claim 4, wherein said first encryption key is a key encryption key.

6. A system according to claim 5, wherein said non-volatile memory stores a plurality of key encryption keys.

7. A system according to claim 5, wherein said non-volatile memory is a battery backed memory.

8. A system according to claim 5, wherein said system receives a randomly-generated second key from said host system and uses said second key to decrypt said data received from said host system using said second key.

9. A system according to claim 8, wherein said second key is a traffic key.

10. A system according to claim 3, wherein said plurality of exponentiators are contained on a single chip.

11. A system according to claim 8, wherein said plurality of exponentiators are contained on a single chip.

12. A system according to claim 2, wherein said logic circuitry disables each of said exponentiators in said plurality of exponentiators that is malfunctioning and selects an exponentiator within said plurality of exponentiators that has not been disabled to receive said data.

13. A system according to claim 3, wherein said logic circuitry disables each of said exponentiators in said plurality of exponentiators that is malfunctioning and selects an exponentiator within said plurality of exponentiators that has not been disabled to receive said data.

14. A system according to claim 2, wherein said logic circuitry monitors the status of the exponentiators, the status including whether each exponentiator is busy or malfunctioning and selects an exponentiator within said plurality of exponentiators that is not busy or malfunctioning to receive said data.

15. A method for performing high speed exponentiation of data transferred from a host system, comprising:

receiving data in encrypted form;

decrypting said encrypted data; and performing exponentiation of the received data to produce resulting data using a plurality of concurrently-operating exponentiators provided to perform exponentiation on data received from the host system.

16. The method of claim 15, wherein at least two exponentiators process data concurrently.

17. The method of claim 15 further comprising encrypting said resulting data after performing exponentiation.

18. A method for performing high speed exponentiation of data transferred from a host system, comprising:

receiving data;

performing exponentiation of said received data to produce resulting data using a plurality of exponentiators provided to perform exponentiation on data received from the host system, wherein the received data is in encrypted form;

decrypting said encrypted data;

encrypting said resulting data after performing exponentiation; wherein said encrypted data has been encrypted at said host system using a second key;

storing a first key in a non-volatile memory;

receiving said second key in encrypted form, wherein said second key has been encrypted using said first key;

decrypting said second key with said first key;

decrypting said received data with said second key; and encrypting said resulting data with said second key after performing exponentiation.

19. The method of claim 18, wherein said first key is a key encryption key, and wherein said second key is a traffic key.

20. The method of claim 19, wherein said non-volatile memory is a battery backed memory.

21. A method for performing high speed exponentiation of data transferred from a host system, comprising:

receiving data;

performing exponentiation of said received data to produce resulting data using a plurality of exponentiators provided to perform exponentiation on data received from the host system wherein at least two exponentiators process data concurrently, wherein the received data is in encrypted form;

decrypting said encrypted data;

encrypting said resulting data after performing exponentiation; and testing whether said plurality of exponentiators function properly and disabling exponentiators in said plurality of exponentiators that are not functioning properly, wherein said received data cannot pass to an exponentiator in said plurality of exponentiators that has been disabled.

22. The method of claim 15, further comprising testing whether said plurality of exponentiators function properly and disabling exponentiators in said plurality of exponentiators that are not functioning properly, wherein said received data cannot pass to an exponentiator in said plurality of exponentiators that has been disabled.

23. A method for performing high speed exponentiation of data transferred from a host system, comprising:

receiving data;

performing exponentiation of said received data to produce resulting data using a plurality of exponentiators provided to perform exponentiation on data received from the host system wherein at least two exponentiators process data concurrently, wherein the received data is in encrypted form;

decrypting said encrypted data;

encrypting said resulting data after performing exponentiation; and monitoring the status of the exponentiators in said plurality of exponentiators to determine if any of the exponentiators in said plurality of exponentiators is in a busy status.

24. The method of claim 21, further comprising monitoring the status of the exponentiators in said plurality of exponentiators to determine if any of the exponentiators in said plurality of exponentiators is in a busy status.

25. A method for performing high speed exponentiation of data, comprising:

transferring data from a host system to a subsystem;

performing exponentiation of said transferred data at said subsystem to produce resulting data using a plurality of exponentiators provided to perform exponentiation on data received from the host system;

encrypting said transferred data at said host system prior to transferring said transferred data to said subsystem; and decrypting said transferred data at said subsystem before performing exponentiation.

26. The method of claim 25, wherein at least two exponentiators process data concurrently.

27. The method of claim 26, further comprising:

encrypting said resulting data at said subsystem; and transmitting said resulting data in encrypted form to said host system.

28. A method for performing high speed exponentiation of data, comprising:

transferring data from a host system to a subsystem;

performing exponentiation of said transferred data at said subsystem to produce resulting data using a plurality of concurrently-operating exponentiators provided to perform exponentiation on data received form the host system; and testing said plurality of said exponentiators and disabling each of said exponentiators in said plurality of exponentiators that does not function properly.

29. The method of claim 25, further comprising testing said plurality of exponentiators and disabling each of said exponentiators that does not function properly.

30. The method of claim 29, further comprising monitoring the status of said plurality of exponentiators to determine if any of said plurality of exponentiators is in busy status.

31. The method of claim 26, further comprising monitoring the status of said plurality of exponentiators to determine if any of said plurality of exponentiators is in a busy status.

32. A method for performing high speed exponentiation of data, comprising:

transferring data from a host system to a subsystem;

performing exponentiation of said transferred data at said subsystem to produce resulting data using a plurality of exponentiators provided to perform exponentiation on data received form the host system;

wherein at least two exponentiators process data concurrently;

storing a first key in said subsystem;

encrypting said transferred data at said host system with said first key prior to transferring said transferred data to said subsystem;

decrypting said transferred data at said subsystem using said first key; and encrypting said resulting data with said first key after performing exponentiation.

33. A method for performing high speed exponentiation of data, comprising:

transferring data from a host system to a subsystem;

performing exponentiation of said transferred data at said subsystem to produce resulting data using a plurality of exponentiators provided to perform exponentiation on data received form the host system;

wherein at least two exponentiators process data concurrently;

storing a first key in said subsystem;

randomly generating a second key at said host system;

encrypting said transferred data at said host system with said second key prior to transferring said transferred data to said subsystem;

encrypting said second key with said first key at said host system;

transferring said encrypted second key and said encrypted data to said subsystem;

decrypting said encrypted second key with said first key at said subsystem; and decrypting said transferred data received at said subsystem using said second key.

34. The method of claim 33, wherein said first key is a key encryption key, and wherein said second key is a traffic key.

35. The method of claim 34, further comprising:

encrypting resulting data with said traffic key; and transmitting said resulting data in encrypted form to said host system.

36. The method of claim 35, wherein said key encryption key is stored in a non-volatile memory in said subsystem.

37. The method of claim 36, wherein said non-volatile memory is a battery backed memory.

38. A method for performing high speed exponentiation of data, comprising:

transferring data from a host system to a subsystem;

performing exponentiation of said transferred data at said subsystem to produce resulting data using a plurality of exponentiators provided to perform exponentiation on data received form the host system;

wherein at least two exponentiators process data concurrently; and wherein said subsystem includes a plurality of chips having at least one exponentiator in said plurality of exponentiators, each of said chips having a common base address and a unique offset address.

39. The method of claim 25, wherein said subsystem includes a plurality of chips having at least one exponentiator in said plurality of exponentiators, each of said chips having a common base address and a unique offset address.

40. A system for performing high speed exponentiation of data, comprising:

a host system;

a subsystem communicating with said host system, said subsystem having an interface for receiving data from said host system, a plurality of concurrently-operating exponentiators provided to perform exponentiation on the data received from the host system, and logic circuitry for selecting an available exponentiator from said plurality of exponentiators to receive said data, said logic circuitry connected between said interface and said plurality of exponentiators, the available exponentiator being selected based on a status indicating it is available for use in processing the received data.

41. The system of claim 40, wherein at least two exponentiators process data concurrently.

42. The system of claim 41, wherein said plurality of exponentiators in said subsystem are contained on a plurality of chips, each of said chips having a common base address and a unique offset address.

43. The system of claim 42, said subsystem further including an encryptor coupled between said plurality of exponentiators and said interface for encrypting data passing between said plurality of exponentiators and said interface.

44. The system of claim 43, wherein said plurality of exponentiators are contained on a plurality of chips, each of said chips having a common base address and a unique offset address.

* * * * *

UNITED STATES PATENT AND TRADEMARK OFFICE
CERTIFICATE OF CORRECTION

PATENT NO. : 6,141,422
DATED : October 31, 2000
INVENTOR(S) : Rimpo et al.

It is certified that error appears in the above-identified patent and that said Letters Patent is hereby corrected as shown below:

Column 8,
Line 21, claim 28, please change the second occurrence of "form" to -- from --.
Line 41, claim 32, please change "form" to -- from --.
Line 59, claim 33, please change "form" to -- from --.

Signed and Sealed this

Fourth Day of December, 2001

Attest:

NICHOLAS P. GODICI
Attesting Officer      Acting Director of the United States Patent and Trademark Office